United States Patent
Chuah et al.

(10) Patent No.: US 6,515,994 B1
(45) Date of Patent: Feb. 4, 2003

(54) METHOD OF COMMUNICATION IN A COMMUNICATIONS NETWORK AND APPARATUS THEREFOR

(75) Inventors: Mooi Choo Chuah, Eatontown, NJ (US); Tzyh-Jong Wang, Edison, NJ (US); On-Ching Yue, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/126,154

(22) Filed: Jul. 30, 1998

(51) Int. Cl.[7] .................................................. H04J 3/24
(52) U.S. Cl. ................... 370/395.6; 370/401; 370/410; 370/432; 370/439; 714/748
(58) Field of Search ................ 370/351, 388, 370/394, 395, 401, 402, 410, 432, 438, 439, 455, 395.2, 395.6, 395.62, 395.63, 395.64, 395.65; 395/200.33, 200.57, 200.66, 200.67, 200.68; 714/748, 749

(56) References Cited

U.S. PATENT DOCUMENTS

| | | | |
|---|---|---|---|
| 5,309,433 A | 5/1994 | Cidon et al. | 370/60 |
| 5,355,371 A | 10/1994 | Auerbach et al. | 370/60 |
| 5,459,725 A | 10/1995 | Bodner et al. | 370/60 |
| 5,541,927 A | 7/1996 | Kristol et al. | 370/94.2 |
| 5,572,678 A | * 11/1996 | Homma et al. | 370/410 |
| 5,631,906 A | * 5/1997 | Liu | 370/455 |
| 5,696,763 A | 12/1997 | Gang, Jr. | 370/390 |
| 5,905,871 A | * 5/1999 | Buskens et al. | 395/200.68 |
| 6,151,696 A | * 11/2000 | Miller et al. | 714/748 |

* cited by examiner

Primary Examiner—Douglas Olms
Assistant Examiner—Shick Hom
(74) Attorney, Agent, or Firm—Synnestvedt and Lechner (57) ABSTRACT

A method of communication in a communications network permitting efficient asynchronous file transfer from a server to a multiplicity of clients. The method is adaptable to future multicasting, telecommunications and file transfer protocols and provides the benefit of decreased communications network traffic relative to prior art methods with a corresponding savings of server, transmission link, router and router network resources. The method provides for sequential transmission of a dataset in discrete blocks over a single data connection spanning the router network. The method includes subsequent joining of destinations to a transmission already in progress. Each subsequently joined destination begins reception of blocks with the next sequentially transmitted block and continues to receive blocks until all blocks in the dataset have been received. Each subsequently joined destination transmits a status signal to the source to ensure retransmission of blocks transmitted prior to a first received block received at each destination.

25 Claims, 4 Drawing Sheets

METHOD OF COMMUNICATION IN A COMMUNICATIONS NETWORK AND APPARATUS THEREFOR

FIELD OF THE INVENTION

This invention relates to communications networks, generally, and more particularly, to a method of communication within such communications networks and apparatus for practicing the inventive method.

BACKGROUND OF THE INVENTION

A communications network provides a means for communication, i.e., exchange or transfer of information, between a multiplicity of data nodes, e.g., host computers, connected within the network by a communications subnet. The subnet comprises switching nodes connected to each other and to the hosts by transmission links capable of carrying transmitted information. Information transmitted via the communications network is often formatted into a plurality of distinct packets for transmission purposes. A data node may be categorized, for any particular communication, as a source (sender) or a destination (receiver). Each packet has a header containing all the routing information necessary to control the switching nodes in order to move the packet along the network from the source to the destination. Packets from a source are switched from switching node to switching node until the packets reach their intended destination.

Various routing protocols are currently used to control the routing of packets from node to node through a communications network. In a point-to-point communications subnet, a destination node requests information from a source node. In this arrangement, the source may be characterized as a server and the destination may be characterized as a client. In such a scenario, the client sends a request for information over the communications network to the server and the server responds by sending the information to the client. The client and the server on a communications network frequently communicate via a transmission control protocol ("TCP") connection. A TCP connection is a bi-directional single communication channel. TCP is a popular method of formatting information into packets for transmission over the communications network.

Frequently, communications between clients and servers involve the transfer of datasets, namely, electronic computer files, from a server to a client. A current popular method of file transfer makes use of a protocol called file transfer protocol (FTP). An FTP session consists of a first TCP connection for control communications ("control TCP connection") and a second TCP connection for data communications ("data TCP connection"). In a typical mode of FTP transmission, the file, or "dataset", to be transmitted is typically divided into a multiplicity of discrete segments or "blocks" by the server. The blocks are then subdivided into smaller TCP packets of digital information and transmitted to the client via the data TCP connection. Once the client has received all of the packets comprising the dataset, the FTP session is terminated. The client has the ability to receive the packets nonsequentially and then sort and reassociate the packets to replicate the blocks transmitted by the server. This ability is referred to herein as the "nonsequential disk writing" capability.

In a multicast communications subnet, a multicast routing protocol is used. Multicast routing is well-known in the art. In a multicast, a single source transmits a communication once and that communication is received at a multiplicity of destinations. In other words, the sender "multicasts" the packets once and a multiplicity of destination hosts may "listen" to the multicast and receive the packets comprising the communication.

In a typical multicast routing protocol, a destination tree or "multicast tree" is defined. A multicast tree is characterized by a root connected to a set of intermediate switching nodes and links which end in a set of leaves. The tree is a database of electronic addresses of switching nodes and links. A typical multicast tree has a source data node as its root, a set of destination nodes as its leaves, and intermediate switching nodes and transmission links connecting the root to the leaves.

The distribution of a file by multicast is typically advertised in advance of the specified time and date of distribution. The advertisement may take many forms but will typically be displayed on a web page providing instructions for joining the multicast tree. Interested individuals will note the time and date of the multicast and listen to the multicast at the designated time and date. Users who fail to join the multicast at the appropriate time will not receive the desired file. The multicast is achieved by transmitting the file from the source to a switching node which has multicast capability and is aware of the intended multicast tree. In this way, the communication is transmitted between the source and the multicast switching node only once. The multicast switching node, on an edge of the network, then relays the communication to the clients joined to the multicast tree.

The multicast tree is identified in the routing field of the packet header by a unique multicast tree address. The same address is associated with each transmission link forming part of the multicast tree. When a multicast packet reaches a switching node, the address in the packet header is compared to the address associated with all outgoing transmission links from that switching node. The packet is then forwarded on each transmission link for which an address match occurs, except for the link on which the packet is received. The destination nodes receive the multicasted packets contemporaneously, or substantially contemporaneously, due to the fact that a packet may have to be switched through varying numbers of switching nodes before reaching various clients.

For multicasts, a modified TCP connection is used between the server and the multicast switching node. This modified TCP connection uses intermediate multicast switching nodes as proxies such that the source waits for acknowledgment of receipt of packets from the intermediate multicast switching nodes rather than from each destination to determine whether the packets have been received complete and intact. The proxies cache the TCP packets they relay until receipt from all intended destinations is acknowledged or until a predetermined length of time passes. Use of such a modified TCP connection is well-known in the art.

Such multicast tree routing has become a common method of transmission due to the efficiencies in the multicast tree protocol.

When a predefined group of clients are to receive a multicast communication, the efficiencies of multicast can be realized. Additionally, when a multiplicity of clients which are members of a multicast tree request a file from a server, and the clients' requests are synchronized, the file may be transmitted once over the network using multicast protocol. The use of multicasts is well known in the art, particularly for computer software distribution. However, the clients must cooperate or be centrally controlled to synchronize their requests in order to realize the savings in network resources associated with the multicast procedure.

In many instances, particularly with the widespread use of the Internet and the World Wide Web, the clients are numerous, not centrally controlled, and are not members of a predefined multicast tree. Rather, the clients are autonomous. Accordingly, the clients' requests for a particular computer file residing on a server are likely to be asynchronous. This is frequently the case for requests for transfer of a new computer software version, general stock market information, etc. The current method of serving such asynchronous requests for file transfer is to utilize separate FTP sessions between the server and the clients for each request. Accordingly, the network resource consumption grows linearly with the number of clients (2N TCP connections for N clients). Because of the limited resources of communications networks generally, and of servers, switching nodes, and transmission links, specifically, it is desirable to reduce the amount of network resources required to service a number of clients in the case of asynchronous requests for file transfers.

Accordingly, it is an object of the present invention to provide an efficient method of communication capable of accommodating asynchronous requests for file transfer from a multiplicity of autonomous clients.

It is another object of the present invention to provide an efficient method of communication which employs multicast protocol and which reduces the amount of network resources used to respond to synchronous requests of a multiplicity of autonomous clients.

It is yet another object of the present invention to provide a communications network capable of carrying out the inventive method for accommodating asynchronous requests for file transfer from a multiplicity of clients.

It is a further object of the present invention to provide a source node capable of carrying out the inventive method for accommodating asynchronous requests for file transfer from a multiplicity of clients.

It is yet a further object of the present invention to provide a destination node capable of carrying out the inventive method for accommodating asynchronous requests for file transfer from a multiplicity of clients.

SUMMARY OF THE INVENTION

These and other objects are realized by the provision of a method providing for sequential transmission of a dataset in discrete blocks over a single data connection spanning the router network. The method further provides for subsequent joining of destinations to a transmission already in progress. Each subsequently joined destination begins reception of blocks with the next sequentially transmitted block and continues to receive blocks until all blocks in the dataset have been received. Each subsequently joined destination transmits a status signal to the source to ensure retransmission of blocks transmitted prior to a first received block received at each destination.

These and other objects are also realized by the provision of a communications network comprising: a source node for transmission of a dataset in a series of blocks, the source node being capable of retransmitting a block responsively to a status signal, the source node being further capable of receiving the status signal intermediate the transmission of the series of blocks; at least a first and a second destination node connected to the network, each destination node being capable of requesting transmission of the dataset from the source node and being further capable of transmitting a status signal to the source indicating its status of reception of blocks relative to the blocks in the dataset; and a multicast switching node for relaying a block received from the source to a destination, the multicast switching node being capable of joining a destination to a transmission intermediate the transmission.

A source node and a destination node for use in carrying out the inventive method are also provided.

DETAILED DESCRIPTION

The present invention relates to communication in a communications network. The inventive method utilizes existing multicasting, telecommunications and file transfer protocols as well as the nonsequential writing capabilities of standard computer hardware storage disks to permit the efficient asynchronous file transfer from a server to a multiplicity of autonomous clients. Advantageously, the method is adaptable for use with future multicasting, telecommunications and file transfer protocols. The inventive method provides the benefit of decreased communications network traffic relative to prior art methods with a corresponding savings of server, switching node and transmission link resources. A communications network, a source node and a destination node for carrying out the inventive method are also provided.

Figure 1:
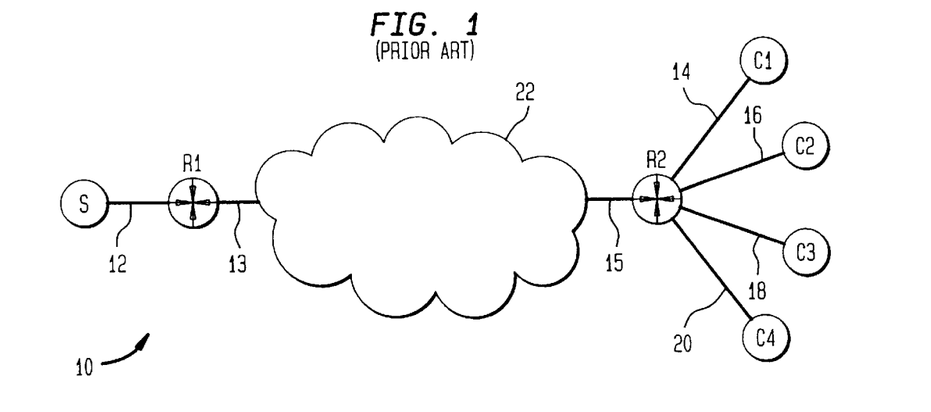
FIG. 1 is a symbolic diagram of a communications network of the prior art.

FIG. 1 is a symbolic diagram of a simplified communications network 10 topology as is known in the art. The inventive method works equally well in complex topologies. Symbolically represented data nodes (computers) in the network 10 are connected to each other by transmission links 12, 13, 14, 15, 16, 18, 20. Data node S has the primary function of acting as a source for communications and so is referred to herein as server S. Server S is connected by a transmission link 12 to a first switching node R1. The switching node R1 is frequently a hardware "router". Server S is connected to a first router R1 on a first edge of the network 10, and clients C1, C2, C3, and C4 are connected to a second router R2 on a second edge of the network 10. The routers R1, R2 are connected via intermediate routers and transmission links represented symbolically at 22, the router network 22 being a subpart of the communications network 10.

In the prior art, asynchronous requests from a plurality of clients for transfer of a file, or "dataset", from the server to each respective client was achieved by communicating between the server and the client without regard to any other clients' requests. Each request was handled independently. As described above, this was commonly achieved by opening an FTP session between the server and each client. In other words, N parallel FTP connections were formed between the server and the clients over the router network for N clients. Accordingly, the server, routers, and transmission links had to simultaneously support, to the extent the responsive transmissions overlapped in time, N FTP (2N TCP) connections for N clients.

Figure 2:
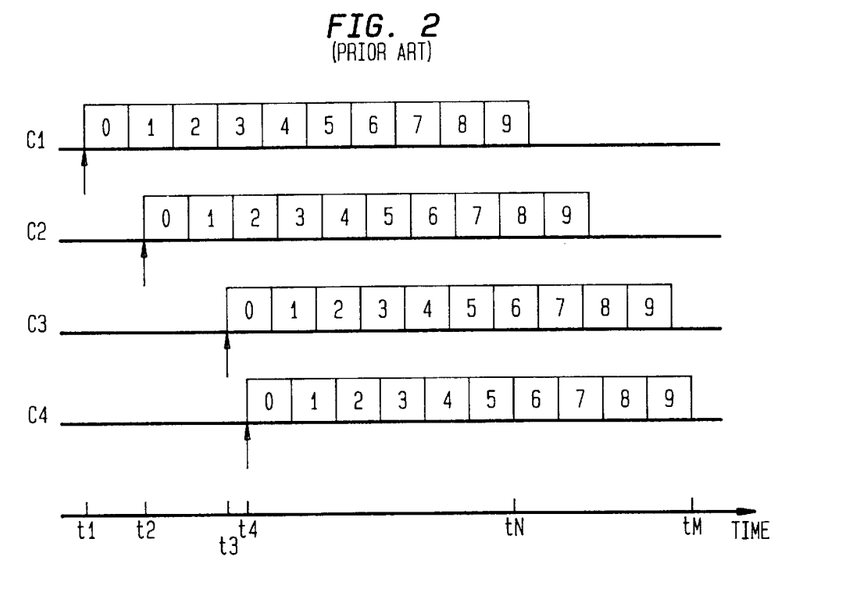
FIG. 2 is a timing diagram illustrating communication in accordance with the prior art.

FIG. 2 is a timing diagram of a simplified example in which four clients C1, C2, C3, C4 asynchronously request a particular dataset comprising ten blocks (B0–B9) and in which the requests are fulfilled according to a prior art method of communication. In the example shown, clients C1, C2, C3 and C4 asynchronously request the dataset at times t1, t2, t3 and t4, respectively. Transmission of the requested dataset blocks ensues (for the example, the time of request and the commencement of transmission are so close in time that they are depicted as identical). C1's FTP session ends at time tN and C4's FTP session ends at time tM. During the temporal interval between t4 and tN, the server is supporting 8 TCP connections, 2 for each client's FTP connection. From t1 to tM, the same dataset blocks are transmitted over the transmission links 12, 13, 15, and the router network 22 joining server S and router R2 four times. Therefore, for communication of a single dataset from server S to each of N clients, the dataset is transmitted N times over the router network 22, utilizing 2N TCP connections, 2N units of transmission link resources, and 2N units of routers R1 and R2 resources, and 2N units of router network resources.

Figure 3:
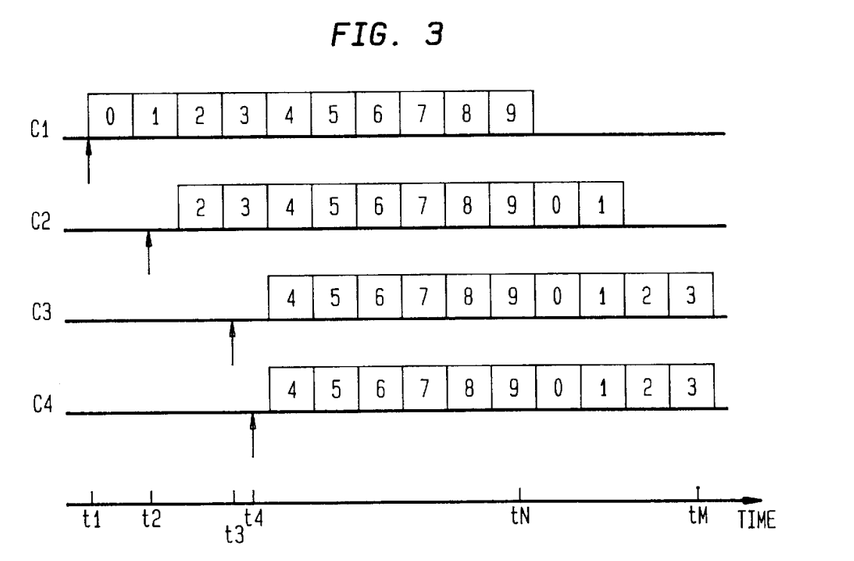
FIG. 3 is a timing diagram illustrating communication in accordance with the present invention.
Figure 4:
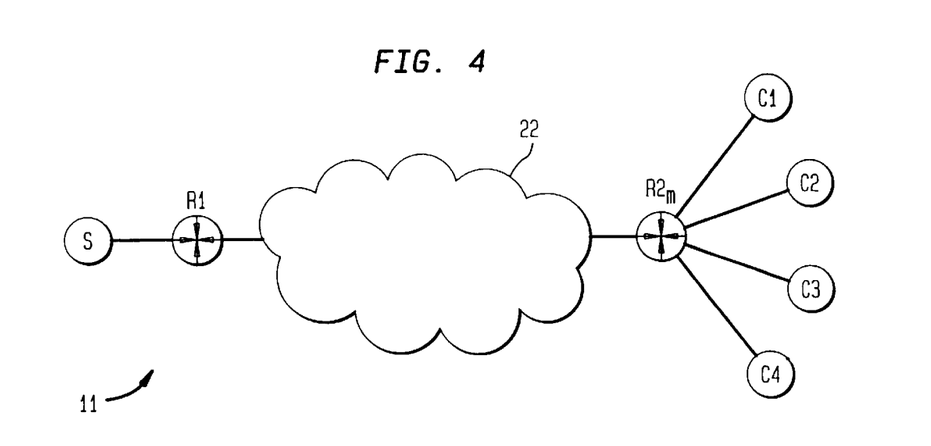
FIG. 4 is a symbolic diagram of a communications network in accordance with the present invention.

The inventive method employs use of a router having multicast capability to significantly reduce use of network resources for multiple asynchronous requests for a particular dataset. A simplified communications network 11 in accordance with the present invention is shown in FIG. 4. Router R2m has multicasting capability. Referring now to FIG. 3, an example analogous to that of FIG. 2 is shown. However, in the example of FIG. 3, the inventive method of communication is used. In such a scenario, dataset blocks B0–B9 are transmitted sequentially over the router network 22 from the server S to the multicasting router R2m. This is achieved by a sequential transmission of the blocks in the dataset over a single data connection rather than the multiple parallel connections described above in regard to the example of FIG. 2. In the preferred embodiment, transmission from server S to N clients is achieved by opening one data TCP connection between the server S and the multicasting router R2m, a data connection between each client and router R2m, and N control TCP connections between the N clients and the server S. This results in N+1 TCP connections with the inventive method, rather than 2N TCP connections as with the prior art method, thereby saving considerable transmission link, router and router network resources. This is particularly beneficial in the case of a large number of clients (N>>1), as is typical of the Internet and World Wide Web.

In carrying out the inventive method, server S first advertises that a multicast session will be used to transfer a particular dataset and specifies an address for the multicast session. Clients interested in receiving that dataset note the multicast address. With the first client's request for the dataset, a multicast session is started with the root at server S and only one leaf at the first client. The first client then begins to receive the block comprising the dataset requested. Other clients' later requests for the dataset may be fulfilled according to the inventive method. Those clients' asynchronous requests are received by the multicasting router and, provided the clients have appropriate permission to do so, the clients join the multicast. However, because these later clients join the multicast intermediate the transmission of the dataset, they miss some blocks which were transmitted to and received by the first client. In accordance with the present invention, each of the later clients transmit a status signal to the server indicating a status of reception of fewer than all of the blocks. Each client has a control means for communicating a reception status signal from the client to the server. The status signal could be in the form of a request for blocks not received or a statement of blocks received. In the preferred embodiment, the status signal identifies the first block received, relative to the series of blocks, at the destination from which the status signal is transmitted. In response to the status signal, the server continues the multicast by retransmitting the blocks not received by the later clients after completing transmission of all of the blocks in the dataset. The retransmitted blocks are transmitted over the third portion to the second client. Each client listens to the multicast until it has received all blocks in the dataset, at which time it separates itself from the multicast tree, i.e., leaves the multicast session.

Figure 5:
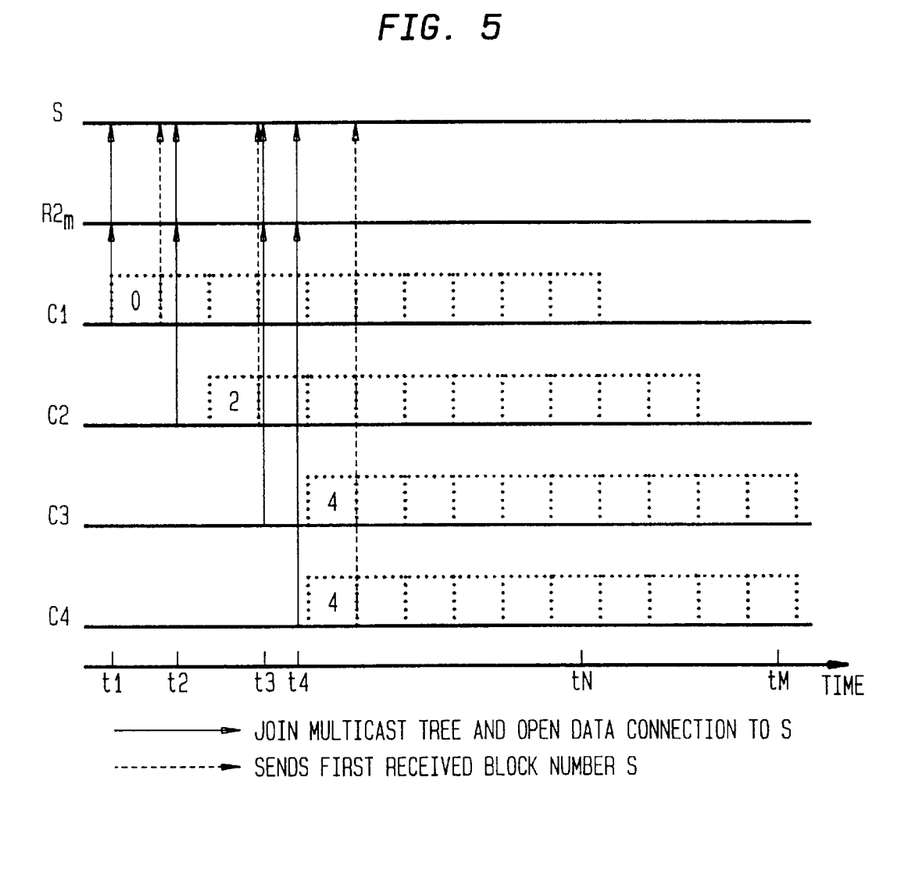
FIG. 5 is a signaling diagram illustrating communication in accordance with the present invention.

A simplified example in which four clients C1, C2, C3, C4 asynchronously request a particular dataset comprising ten blocks (B0–B9) and in which the requests are fulfilled in accordance with the inventive method is shown symbolically in FIG. 3. Referring now to FIG. 3, autonomous client C1 requests to join a multicast session to receive the dataset distributed by server S at time t1 in FIGS. 3 and 5. In the preferred embodiment, an FTP connection, comprising a data TCP and a control TCP connection, is established between server S and client C1 via the multicast router R2m. The FTP connection comprises a first communication path having a first portion from server S to the multicasting router R2m and a second portion from R2m to client C1. As used herein, the term "communication path" refers to a logical path having known intermediate points and/or endpoints. As is typical of communication or packet switching networks, the actual physical path between the intermediate and/or endpoints may be unpredictable or variable. As shown in FIG. 5, this is achieved by client C1's contacting R2m and S, requesting to receive the dataset by multicast and opening a data and a control TCP connection to S. The series of individual dataset blocks B0–B9 making up the requested dataset are then transmitted sequentially via the data TCP connection. The individual dataset blocks are transferred according to the following FTP specifications: Type—image, Format Control—nonprint only, Structure—file structure only, Transmission Mode—block mode. In block mode, the dataset is divided into a series of discrete blocks, as described above and as is well known in the art. Each block contains information which expresses the block's relationship to all the blocks, e.g., B2 is block 3 of 10 blocks.

In the example of FIG. 3, transmission of the dataset blocks B0–B9 from server S to client C1 begins at time t1. In accordance with the present invention, client C1 transmits a status signal to the server immediately after receipt of a first received block, namely B0 in this example. The status signal employs a new command that identifies the first received block at the client relative to the series of blocks in the dataset. This new command is operable within the present FTP framework.

Later in time, at t2, client C2 requests the same dataset by signaling the multicast router R2m and requesting to join the multicast session, as shown in FIG. 5. With respect to C1, C2 is a subsequently joined destination or, as referred to herein, a "subsequent destination". At this time, C1 has received fewer than all of the blocks in the dataset. In addition, C2 opens a control TCP connection to server S. By joining the multicast tree, clients C1 and C2 will listen to the multicast and will receive the dataset blocks transferred from S on a single data TCP connection between the server S and multicast router R2m. In other words, C2 receives blocks over a second communication path comprising the same first portion between server S and multicasting router R2m used by C1 as well as a third portion between multicasting router R2m and client C2. C2's receipt of the multicasted blocks begins with the next complete block transmitted. By joining the multicast at time t2, C2 has missed a segment of the dataset comprising blocks B0 and B1.

In the preferred embodiment, each client transmits its status signal to the server over the control TCP connection after its receipt of a first received block at that client, B2 for C2 in this example. In the example, client C2 transmits its status signal to server S indicating that its first received block was block B2. This signal acts as client C2's request for server S to continue the multicast by retransmitting those blocks transmitted to the set of destinations prior to transmission of the first block received by client C2, namely, blocks B0 and B1. In other words, with respect to C2, B0 and B1 comprise a remaining segment of blocks.

According to the inventive method, client C2 will continue to receive all of the remaining blocks transmitted to client C1. In the example in FIG. 3, this includes blocks B2–B9. At time tN, client C2 has received a segment of the dataset including blocks B2–B9. Once client C1 has received all of the blocks making up the dataset, namely, B0–B9, client C1 notifies the multicasting router R2m of this fact and leaves the multicast session, as shown at time tN in FIG. 3 and as shown in FIG. 5. In other words, client C1 separates from the set of destinations after receipt of all blocks in the dataset. Client C1's receipt of the last block B9 making up the dataset is represented in FIGS. 3 and 5 as occurring at time tN. In the preferred embodiment, client C1 also terminates its control TCP connection to server S at time tN, after its receipt of all blocks in the dataset.

Additional clients may join the multicast later in time. In the example of FIG. 3, clients C3 and C4 join the multicast session at times t3 and t4 respectively. These later clients communicate as did client C2. However, when client C3 transmits its status signal to server S indicating that its first received block was block B4, server S will respond by continuing the multicast by retransmitting blocks B2 and B3, although C3 has missed blocks B0, B1, B2 and B3, since server S will already be continuing the multicast with blocks B0 and B1 in response to client C2's status signal. In other words, the server will retransmit a supplemental segment of blocks comprising blocks B2 and B3 to the set of destinations. There is no need to retransmit B0 and B1 again in response to C3's status signal since C3 will receive blocks B0 and B1 by multicast when they are transmitted in response to C2's request.

After the last client, C4 in the example, has separated from the multicast tree, server S terminates the data TCP connection to the multicasting router R2m. This occurs at time tM in the example illustrated in FIG. 3.

Figure 6:
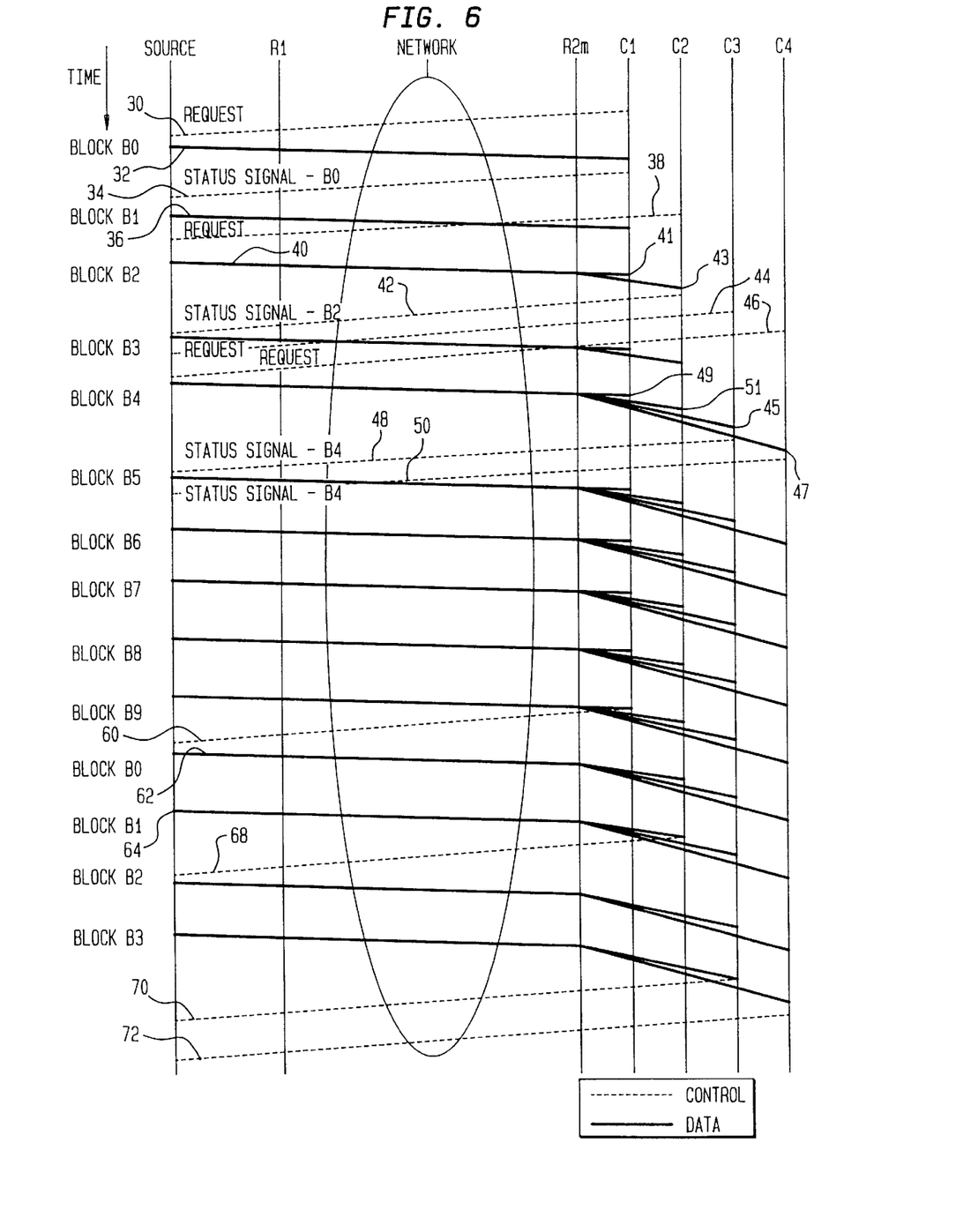
FIG. 6 is a timing diagram illustrating communication in accordance with the present invention.

Communication according to the inventive method as described above is shown in a timing diagram in FIG. 6. Referring now to FIG. 6, C1 first establishes a control connection to the source and sends a request 30 for transfer of a dataset to the source via the control connection. The source responds establishing a data connection to multicasting router R2m for transmission of the dataset to a multicast tree with a root at the source and one leaf at C1. Sequential transmission of the blocks (B0–B9) comprising the dataset then commences with block B0, which is transmitted from the source to router R1 and then to multicasting router R2m over the data connection, as shown at 32. R2m then relays block B0 to C1. C1 then transmits a status signal to the source over its control connection after receipt of its first received block, namely B0, as shown at 34. The status signal identifies the first received block as B0. Accordingly, the source will continue transmitting blocks B1 to B9.

B1 is then transmitted to C1 as described above and as shown at 36. Then, as shown, autonomous client C2 subsequently transmits a request 38 to R2m to join the multicast, i.e., to join the set of destinations (multicast tree), and establishes a control connection to the source. C2 is joined to the multicast tree and begins receipt of blocks with the next sequential block transmitted by the source, namely, B2. Both C1 and C2 receive B2 by multicast transmission as shown at 41 and 43. B2 then transmits a status signal to the source identifying B2 as the first block received by C2 as shown at 42. In the example, C3 and C4 subsequently request 44, 46 to join the multicast tree and C3 and C4 establish control connections to the source. C3 and C4 begin to receive blocks with the next sequential block transmitted by the source, namely B4. C1 and C2 also receive B4 as shown at 49, 51. C3 and C4 then transmit status signals to the source identifying B4 as the first received block received by C3 and C4 as shown at 48, 50.

The source continues to sequentially transmit blocks B5 through B9 and those blocks are received at C1, C2, C3 and C4. After receipt of block B9, C1 has received all blocks in the dataset (B0–B9). Accordingly, C1 separates from the multicast tree and terminates its control connection to the source as shown at 60. Pursuant to C2's status signal, the source continues the multicast by retransmitting blocks B0 and B1 as shown at 62, 64. Blocks B0 and B1 are received by C2, C3 and C4, which are still attached to the multicast tree. After receipt of B1, C2 has received all blocks in the dataset (B0–B9) and therefore separates from the multicast tree and terminates its control connection to the source as shown at 68. Pursuant to the requests of C3 and C4, the source continues the multicast by retransmitting blocks B3 and B4. Blocks B3 and B4 are received by C3 and C4, which are still attached to the multicast tree. After receipt of B4, C3 and C4 have received all blocks in the dataset (B0–B9) and they separate from the multicast tree and terminate their control connections to the source as shown at 70, 72. The source then terminates the data connection to R2m (not shown).

It should be noted that, according to the inventive method, server S in the example of FIGS. 3 and 6 sequentially multicasts blocks B0–B9 followed by blocks B0–B3 over the router network 22 via a single data TCP connection to multicasting router R2m. By doing so, server S fulfills clients' C1, C2, C3, C4 asynchronous requests for transfer of blocks B0–B9 (i.e., the entire dataset requested) using only a single data connection spanning the router network. The nonsequential receipt of blocks B0–B9 by clients C2, C3 and C4 is of no consequence since the clients have nonsequential disk writing capability.

The inventive method thereby provides significant savings in server, transmission link, router, and router network resources relative to the prior art method used in the example of FIG. 2 in which dataset blocks B0–B9 are transmitted in parallel between server S and clients C1, C2, C3, C4.

It should be noted that the inventive method is easily extensible, equally workable and even more beneficial in communications networks having more complex topologies including a greater number of servers, clients, routers transmission links, and asynchronous requests.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of communication of a dataset from a source data node, the method comprising the steps of:
   (a) transmitting the dataset to a predefined set of destinations comprising a first destination, a subsequent destination being added to the set of destinations during transmission of the dataset, the first destination receiving the dataset, the subsequent destination receiving a segment of the dataset transmitted after being added to the set of destinations; and
   (b) retransmitting, for the subsequent destination, a remaining segment of the dataset comprising that portion of the dataset received by the first destination but not by the subsequent destination.

2. The method set forth in claim 1, wherein the retransmitting step is performed responsive to a first status signal received at the source data node from the subsequent destination.

3. The method set forth in claim 2, wherein a next subsequent destination joins the set of destinations after the adding of the subsequent destination, the method further comprising the step of:
   (c) retransmitting to the set of destinations responsive to a second status signal received at the source data node from the next subsequent destination, a supplemental segment of the dataset comprising that portion of the dataset received by the first and subsequent destinations but not by the next subsequent destination, step (c) being performed subsequent step (b).

4. The method set forth in claim 3 wherein the dataset comprises a series of discrete blocks.

5. The method set forth in claim 4 wherein each segment comprises at least one block.

6. The method set forth in claim 5 wherein each of the first destination, subsequent destination and next subsequent destination transmits a respective status signal immediately after its receipt of a first received block.

7. The method set forth in claim 6 wherein the respective status signal identifies the first received block received at the respective destination from which it is transmitted.

8. The method set forth in claim 7 wherein each destination separates from the set of destinations after receipt of all blocks in the dataset.

9. The method set forth in claim 8 wherein the series of blocks are transmitted to the set of destinations via a data transmission connection connecting the source data node to each destination of the set of destinations via a switching node having multicast capability.

10. The method set forth in claim 9 wherein the blocks are transmitted and retransmitted to the set of destinations during a multicast session.

11. The method set forth in claim 10 wherein each destination transmits its status signal via a control connection to the source data node.

12. The method set forth in claim 11 wherein the control connection is a TCP connection and wherein steps (a) and (b) are performed via a TCP connection.

13. A method of communication of a dataset comprising a series of blocks from a source data node, the method comprising the steps of:
   (a) sequentially multicasting the series of blocks to a set of destinations comprising a first destination, a subsequent destination being added to the set of destinations during multicasting of the series of blocks, the first destination receiving the series of blocks, the subsequent destination receiving those blocks multicasted after adding the subsequent destination to the set of destinations; and
   (b) repeating sequential multicasting of those blocks not having been multicasted since adding of the subsequent destination to the set of destinations.

14. The method set forth in claim 13, wherein the repeating step is performed responsive to the first status signal received at the source data node from the subsequent destination.

15. The method set forth in claim 14, wherein a next subsequent destination joins the set of destinations after the adding of the subsequent destination to the set of destinations, the method further comprising the step of:
   (c) repeating, responsive to a second status signal received at the source data node from the next subsequent destination, sequential multicasting of those blocks not having been multicasted since joining of the next subsequent destination to the set of destinations, step (c) being performed subsequent step (b).

16. The method set forth in claim 15 wherein each of the first destination, subsequent destination and next subsequent destination transmits its respective status signal immediately after receipt of a first received block at the destination.

17. The method set forth in claim 16 wherein the respective status signal identifies the first block received at the destination from which it is transmitted.

18. The method set forth in claim 17 wherein each destination separates from the set of destinations after receipt of all blocks in the dataset.

19. The method set forth in claim 18 wherein each destination transmits its respective status signal via a control connection to the source data node.

20. The method set forth in claim 19 wherein the control connection is a TCP connection and wherein steps (a) and (b) are performed via a TCP connection.

21. A method of communication of a dataset comprising a series of blocks from a source data node, the method comprising the steps of:
   (a) sequentially transmitting the series of blocks in the dataset to a set of destinations comprising a first destination;
   (b) receiving at the source data node a first status signal transmitted from a subsequent destination, the subsequent destination being added to the set of destinations during the transmitting step, the first destination receiving the dataset, the subsequent destination receiving a segment of the dataset transmitted after adding the subsequent destination to the set of destinations; and
   (c) retransmitting to the set of destinations responsive to the first status signal, those blocks not received by the subsequent destination.

22. The method set forth in claim 21, wherein a next subsequent destination joins the set of destinations after the adding of the subsequent destination, the next subsequent destination receiving those blocks transmitted and retransmitted to the set of destinations after the next subsequent destination joined the set of destinations, the method further comprising the step of:

(d) retransmitting to the set of destinations responsive to a second status signal received at the source data node from the next subsequent destination, those blocks not received by the next subsequent destination, step (d) being performed subsequent step (c).

23. The method of claim 22 wherein the second status signal transmitted from the next subsequent destination is received at the source data node intermediate steps (b) and (c).

24. The method of claim 22 wherein the second status signal transmitted from the next subsequent destination is received at the source data node intermediate steps (c) and (d).

25. The method of claim 24 wherein each destination separates from the set of destinations after receipt of all blocks in the dataset.

* * * * *